UNITED STATES PATENT OFFICE.

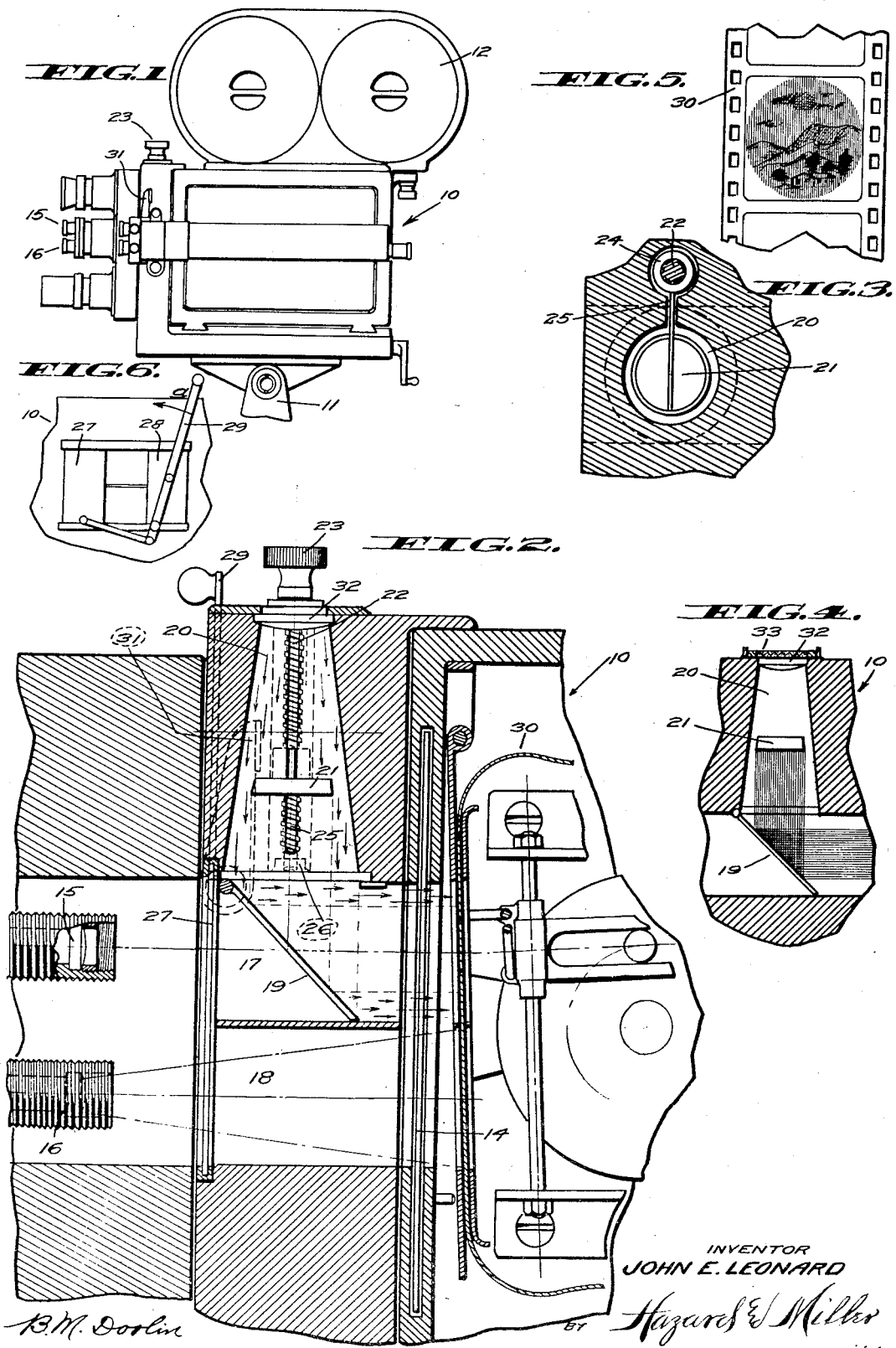
J. E. LEONARD.
WHITE DISSOLVE MECHANISM FOR MOTION PICTURE CAMERAS.
APPLICATION FILED APR. 20, 1917. RENEWED FEB. 12, 1919.
1,298,521. Patented Mar. 25, 1919.
INVENTOR
JOHN E. LEONARD

JOHN E. LEONARD, OF LOS ANGELES, CALIFORNIA.

WHITE-DISSOLVE MECHANISM FOR MOTION-PICTURE CAMERAS.

1,298,521.    Specification of Letters Patent.    Patented Mar. 25, 1919.

Application filed April 20, 1917, Serial No. 163,498. Renewed February 12, 1919. Serial No. 276,603.

*To all whom it may concern:*

Be it known that I, JOHN E. LEONARD, a citizen of the United States, residing at Los Angeles, in the county of Los Angeles and State of California, have invented new and useful Improvements in White-Dissolve Mechanism for Motion-Picture Cameras, of which the following is a specification.

This invention relates to a camera and particularly pertains to a white dissolve mechanism for a motion picture camera.

Heretofore it has been common practice in motion picture production to fade the scenes out by causing them to gradually become dark and indistinct. Considerable effort has been expended in endeavoring to fade scenes out to a white field instead of the dark field usually obtained, and it is the principal object of this invention to provide means whereby this result may be satisfactorily accomplished.

Another object of this invention is to provide a dissolve mechanism which may be easily actuated by the operator of the camera without interfering with the continuous operation of the shutter mechanism.

Another object of this invention is to provide simple means whereby the dissolve mechanism may be used or dispensed with without requiring the attachment of parts to the camera and without danger of a leakage of light to the film.

Another object of this invention is to provide means whereby various light effects may be produced upon the film without resorting to the practice of placing screens and lenses over the photographic lenses as is commonly done.

It is a further object of this invention to provide a dissolve mechanism which is simple in its construction, is formed of few operating parts, and will act positively at all times.

Other objects will appear hereinafter.

The invention is illustrated, by way of example, in the accompanying drawings in which:

Figure 1 is a view in side elevation illustrating the complete camera and particularly disclosing the point at which the dissolve mechanism is positioned.

Fig. 2 is an enlarged fragmentary view in section and elevation illustrating the dissolve mechanism and its relation to the lenses and shutter of the camera.

Fig. 3 is a fragmentary view in plan illustrating the position of the actuating screw in relation to the light well of the dissolve apparatus.

Fig. 4 is a fragmentary view in diagram disclosing the manner in which the light rays act to produce the dissolve effect.

Fig. 5 is a fragmentary view of a film, disclosing the manner in which the dissolve affects the scene.

Fig. 6 is a fragmentary view in elevation illustrating the lap dissolve mechanism.

Referring more particularly to the drawings, 10 indicates the case of a motion picture camera, which is here shown as mounted upon a suitable tripod 11. Disposed above the case is a film box 12 from which film is carried through the camera and the shutter mechanism 14. As here shown, the shutter mechanism is fitted with a pair of double exposure lenses 15 and 16 which are superimposed in relation to each other and adapted to project light rays through exposure openings 17 and 18. These openings are formed through the front wall of the case and cause the light rays from the lenses to fall upon the film when the shutter 14 is opened.

The upper exposure aperture 17 is formed with a vertically swinging reflector 19 adapted to swing downwardly across the opening and assume an inclined position to the horizontal floor thereof. The upper face of this member is highly polished and will reflect light rays which fall upon it from a light well 20. It will be understood that under normal conditions the reflector is swung upwardly and suitably held over the lower opening of the light well and will thereby form a top wall for the exposure aperture 17. This well is vertically disposed in relation to the opening 17 and is adapted to be opened and closed by a valve member 21. The walls of the well are equally tapered and form a passage-way of frusto-conical shape. The valve member 21 is also frusto-conical and is adapted to normally seat against the side walls of the light well. While the light well and the valve member are here shown as circular, it will be understood that the shape of these members is immaterial and that if preferred they may be square. In this case, however, the field formed by the exposure of the film through the light well will be of square shape rather than circular.

In order that the valve member may be easily and gradually moved, an actuating screw 22 is provided and fitted with a thumb nut 23. This screw stands vertically alongside the light well and is engaged by a bracket 24 which extends outwardly through a slot 25 in the side of the light well wall. The lower end of the screw is mounted within a suitable bearing 26 which holds it in its vertically alined position.

It has been found desirable to cloud the film during scenes of certain character and in this structure the effect is produced by placing various translucent screens 33 over the opening at the top of the light well. This will sift the light and modify it as desired.

Acting in combination with the double exposure lenses and the white dissolve mechanism is a lap dissolve, which is formed of sliding shutters 27 and 28. These shutters are disposed in front of the apertures 17 and 18 and are simultaneously actuated by a lever 29 to gradually close the apertures from their opposite sides.

In operation, a film 30 is fed from the film box 12 and through the shutter mechanism 14. This film, under normal conditions, will be simultaneously exposed to the light rays from lenses 15 and 16 as they pass through the apertures 17 and 18. When it is desired to produce the white dissolve effect, the swinging reflector 19 is actuated by a lever 31 to swing it downwardly into the position shown in Fig. 2 of the drawings. After this has been done, the thumb nut 23 and the screw 22 are turned to move the valve member 21 downwardly and away from its seated position against the tapering side walls of the light well 20. The top of the light well is fitted with a correcting lens 32 which causes the light to spread within the well and to pass around the edges of the valve member 21. This light will strike the mirrored surface of the reflector 19 and will be projected upon the film. This will cause the corners of the film field to be exposed and will leave a circular central field unexposed. This field may be determined by the distance of movement given the valve member 21 in a downwardly direction. It will be evident that as the valve member reaches the bottom of the light well the unexposed area upon the film will be very small. As the film passes downwardly from the aperture 17 to register with the aperture 18, it will be exposed to the rays passing through lens 15 and by which the scene is being photographed. This will cause the unexposed central portion of the field to record the scene and permit it to dissolve into the white background produced by the light rays which have been projected by the reflector 19. While the mechanism here described is shown in connection with a double exposure photographic lens, as disclosed in my co-pending application entitled Double exposure lenses, filed April 20, 1917, Serial Number 163,497, it will be understood that a single lens may be used in the same manner. This is due to the fact that the single lens is designed to focus through the aperture 18 and will permit the film to be exposed by the white dissolve apparatus through the aperture 17 prior to the exposure through the aperture 18. Thus it will be seen that the same results may be obtained with any lens or combination of lenses.

The lap dissolve is actuated when desired by swinging the lever 29 in the direction of the arrow —a—. This will cause the shutters 27 and 28 to simultaneously draw together and close the apertures 17 and 18.

It will thus be seen that the mechanism here provided will produce a very new and novel effect by means of an apparatus which is simple in its construction and may be simultaneously operated as the shutter mechanism is operated and the film fed.

While I have shown the preferred construction of my white dissolve mechanism as now known to me, it will be understood that various changes in the combination, construction and arrangement of parts may be made by those skilled in the art without departing from the spirit of my invention.

I claim:

1. In a white dissolve mechanism for moving picture cameras, the combination with a photographic film, of a photographic lens adapted to expose said film, and means whereby the film may be preëxposed to reduce the photographic field which will thereafter record the exposure made through the photographic lens.

2. In a white dissolve mechanism for moving picture cameras, the combination with a photographic film, of a photographic lens adapted to expose said film, means whereby the film may be preëxposed to reduce the photographic field which will thereafter record the exposure made through the photographic lens, and means whereby the size of the preëxposed field may be varied.

3. In a white dissolve mechanism for moving picture cameras, the combination with a photographic film, of a photograhpic lens adapted to expose said film, means whereby the film may be preëxposed to reduce the photographic field which will thereafter record the exposure made through the photographic lens, and operating means for gradually increasing or decreasing the unexposed area during the preëxposure.

4. In a white dissolve mechanism for moving picture cameras, the combination with a photographic film, of a photographic lens adapted to expose said film, means whereby the film may be preëxposed to reduce the photographic field which will thereafter record the exposure made through the photographic lens, operating means for gradually increasing or decreasing the unexposed area during the preëxposure, and means for readily rendering the preëxposure apparatus operative or inoperative as desired.

5. A white dissolve machanism for moving picture cameras, comprising photographic lenses, means whereby a photographic film may be preëxposed to rays of light and thereafter exposed to the photographic lenses, and means whereby said rays of light may be distributed upon the film in a manner to cause a central area of the film to remain unexposed.

6. A white dissolve mechanism for moving picture cameras, comprising photographic lenses, means whereby a photographic film may be preëxposed to rays of light and thereafter exposed to the photographic lenses, means whereby said rays of light may be distributed upon the film in a manner to cause a central area of the film to remain unexposed, and means whereby said central unexposed area may be varied.

7. A white dissolve mechanism for moving picture cameras, comprising photographic lenses, means whereby a photographic film may be preëxposed to rays of light and thereafter exposed to the photographic lenses, means whereby said rays of light may be distributed upon the film in a manner to cause a central area of the film to remain unexposed, and means for gradually increasing or decreasing said central unexposed area of the film.

8. A white dissolve mechanism for moving picture cameras, comprising a light well, a reflector positioned at the bottom of said well and disposed at an inclination thereto, and a valve adapted to open and close the light well in a manner to permit rays of light to pass around the edges of the valve and after striking the reflector be projected upon a photographic film.

9. A white dissolve mechanism for moving picture cameras, comprising a light well, a reflector positioned at the bottom of said well and disposed at an inclination thereto, a valve adapted to open and close the light well in a manner to permit rays of light to pass around the edges of the valve and after striking the reflector be projected upon a photographic film, and means whereby the volume of light rays striking the reflector may be increased or decreased as desired.

10. A white dissolve mechanism for moving picture cameras, comprising a light well, a reflector positioned at the bottom of said well and disposed at an inclination thereto, a valve adapted to open and close the light well in a manner to permit rays of light to pass around the edges of the valve and after striking the reflector be projected upon a photographic film, means whereby the volume of light rays striking the reflector may be increased or decreased as desired, and means whereby the dissolve mechanism may be sealed by the reflector when its use is not desired.

In testimony whereof I have signed my name to this specification.

JOHN E. LEONARD.